March 3, 1959  B. GOODMAN  2,875,470
KNOCKDOWN-TYPE SPOT VULCANIZER
Filed March 22, 1957

Ben Goodman
INVENTOR.

BY *Clarence A. O'Brien*
*and Harvey B. Jackson*
Attorneys

2,875,470

KNOCKDOWN-TYPE SPOT VULCANIZER

Ben Goodman, Baltimore, Md.

Application March 22, 1957, Serial No. 647,875

4 Claims. (Cl. 18—18)

The present invention relates to an improved spot vulcanizer which is satisfactorily constructed and capable of use in repairing a heavy-duty pneumatic tire while fully mounted on a vehicle and without requiring the vehicle to be jacked up.

It is a matter of common knowledge that heavy-duty pneumatic tires such as are used for example on earth movers and similar equipment pose a problem when sidewall spot vulcanizing jobs are at hand. Time consuming and painstaking efforts have heretofore been necessary and various prior art adaptations and equipment have been suggested for use. It is an object of the instant invention to enable one to cope with the problem in an expeditious and time-saving manner. Therefore, the present invention involves the appropriation of a simple, practical, easy-to-use knockdown-type spot vulcanizer.

Another object of the invention is to advance the art by way of a simple and practical time and labor saving device which is an improvement on similar constructed and performing prior art adaptations, for example, Patent 2,479,229 granted to me on August 16, 1949. To this end, a portable knockdown base structure is provided and is adapted to rest firmly on the floor or other support surface. It includes fixed vertical abutments which are obliquely disposed and toe in toward each other and abut the inner sidewall of the tire at circumferentially spaced points. Upright means is provided at the outer end portion of the base structure and this is constructed to accommodatingly position an accessible jack or an equivalent thrust device whereby to permit a suitably formed hot plate to be operatively pressed against the injured spot on the tire.

Novelty is also predicated on a sectional base structure or means which is characterized by a pair of spaced parallel rigid rails having lateral upright members at their inner and outer ends, the uprights at the outer ends serving to retain a cross member which is employed for basing the jack.

Then, too, novelty is predicated on using base members or rails which are V-shaped in cross-section and which are positioned with their open sides downwardly and which therefore function as elongated chocks, the inner end portions thereof being wedged in place between circumferentially spaced portions of the tire and the floor or other foundation.

Features and advantages not specifically set forth above will become evident from the description of the details and the accompanying sheet of illustrative drawings.

In the accompanying drawing wherein like numerals are employed to designate like parts throughout the views.

Figure 1:
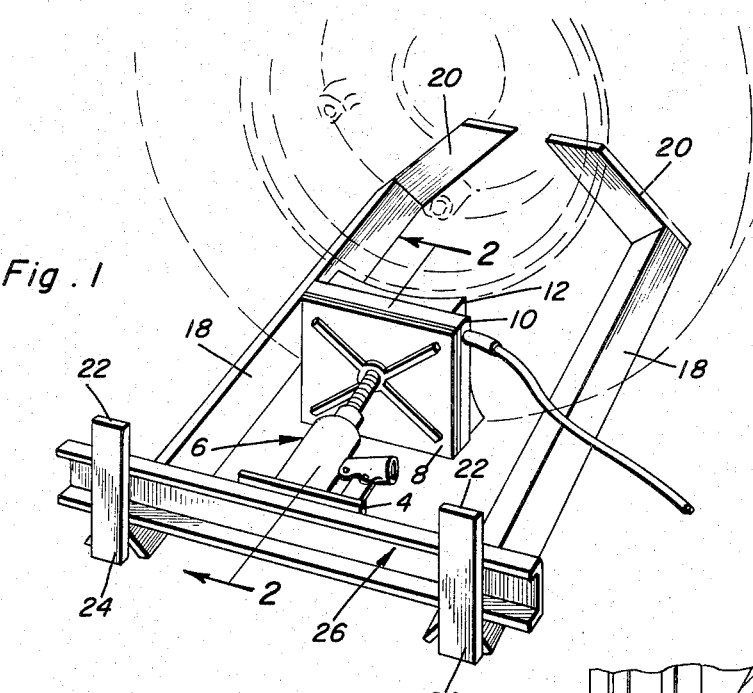
Figure 1 is a perspective view of a knockdown-type spot vulcanizer constructed in accordance with the principles of the invention and showing the preferred manner in which it is used.
Figure 2:
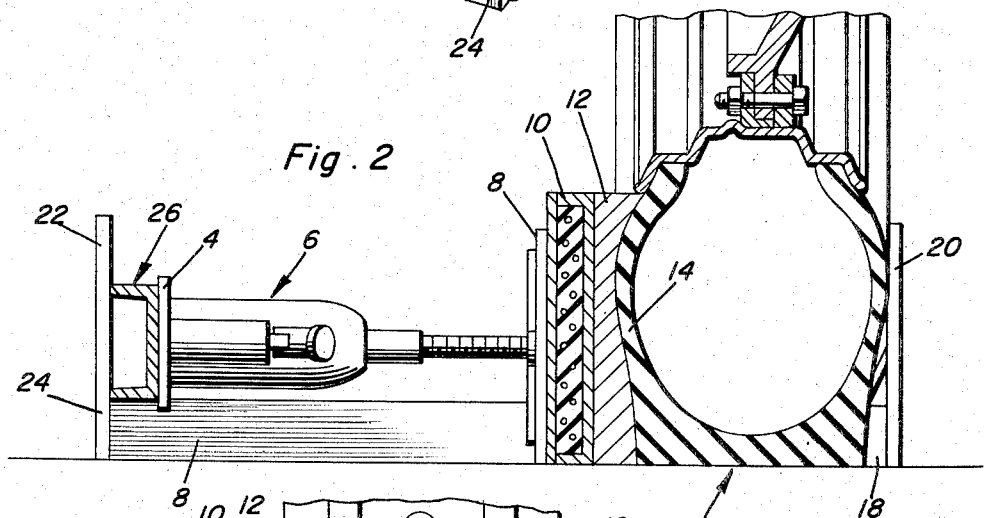
Figure 2 is a view in section and elevation which may be said to be taken approximately on the plane of the line 2—2 of Figure 1 looking in the direction of the arrows.

As before stated the invention in its preferred embodiment is characterized by a novel base structure which serves to accommodate the base 4 of a jack 6 the head 8 of which is operatively connected in any suitable manner to an electric heater unit 10 which in turn bears against and operatively cooperates with an aluminum or equivalent plate 12. Varying sizes and contours of plates will of course be used depending upon the area of the side or other wall 14 of the tire 16 which is to be repaired. It will be remembered that in this invention it is possible to apply and remove the device and to achieve the desired end without removing the tire. Or stated otherwise, the invention is intended for satisfactory use in repairing heavy-duty pneumatic tires while fully mounted on the vehicle and without requiring the vehicle to be jacked up.

The base structure is knockdown and therefore sectional. There are two duplicate sections. Each section comprises a horizontal base rail 18. This is preferably V-shaped in cross-section and the open side of the rail faces down and rests upon the support surface in the manner illustrated in the drawings. At the inner end of each rail there is a lateral upstanding member 20 which may be called an arm but is preferably treated as an abutment. This is shown bearing against the sidewall of the tire opposite to the wall which is being repaired in the manner shown in the drawings. When the two rails are in position the abutments are oblique angled and toe in toward each other. They nevertheless engage the tire at circumferentially spaced points. There is also a fixed upright 22 at the outer end of each rail and this is welded or otherwise connected at its lower end 24 to the cooperating end of the rail. Thus, the rail is V-shaped in cross-section and has laterally disposed uprights at its respective ends. The third part of the base structure comprises a rigid end thrust bar or member 26. This is preferably a simple channel-iron which spans the space between the uprights 22 and rests atop the ridge portion of the cooperating ends of the rails 18. When in this position it serves as a satisfactory stabilizing and positioning support for the base 4 of the jack 6 in the manner shown. By reason of the V-shaped cross-section the rails serve as elongate chocks and when they are slid into position they become wedged between circumferentially spaced portions of the tread of the tire and the ground or other support surface as is obvious. This provides a satisfactory support and place of anchorage for the tire while the repair is being made.

Figure 3:
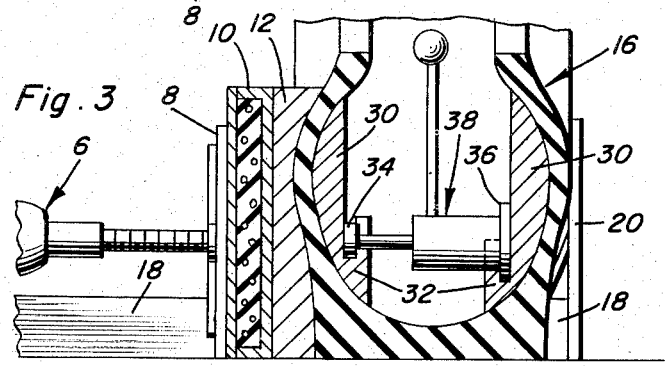
Figure 3 is a fragmentary view with parts in section and elevation similar to Figure 2 but showing stabilizing means situated in the air chamber of the tire.

The manner in which the device is constructed, set-up for use and is used is evident, it is believed from the several views of the drawings. In these circumstances a more elaborate description is thought to be unnecessary. It is to be pointed out however that when desired the invention may also be employed in the manner shown in Fig. 3 wherein the tire has been demounted and wherein instead of relying on the air in the tire mechanical means is inserted to stabilize the side walls of the tire. This means may be used in lieu of sandbags which are commonly employed. In any event the means comprises a pair of rigid adapters 30 having notched out portions 32 to accommodate the parts 34 and 36 of the jack 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spot vulcanizer capable of use in spot-vulcanizing a heavy-duty pneumatic tire while it is fully mounted on a vehicle and without requiring the vehicle to be jacked up comprising, in combination, horizontal base means adapted to rest firmly on the floor or other support surface, fixed abutments carried by said base means and adapted to firmly abut the inner side wall of the tire while the tread of the tire rests atop portions of the base means, upright means at the outer end portion of said base means, a spot vulcanizing plate adapted to contact the injured portion of the outer side wall of said tire, a heater unit cooperating with said plate, and a separate end thrust jack removably interposed between said upright means and heater unit, said base means being knockdown in form and embodying a pair of spaced parallel rails separate from each other the inner end portions and abutments of which are disconnected and may be individually located and chocked between circumferentially spaced portions of the tire tread and said support surface.

2. The structure defined in claim 1 and wherein said rails are V-shaped in cross-section to facilitate carrying out the steps of first placing the rails in operative position, during which time they are securely wedged in place and are held against displacement by the weight and pressure-contact of the heavy-duty tire, and secondly to facilitate carrying out of the steps of bodily removing the rails after the repair has been made.

3. A portable knockdown spot vulcanizer comprising, in combination, a pair of companion but wholly separate disconnected sections, each section comprising a rigid straight chock-like rail V-shaped in cross-section having a perpendicular upright rigidly fixed to its outer end and extending vertically above the lengthwise apical ridge of said section, and an upstanding oblique angle tire wall abutment fixed on and extending laterally from its inner end, and a third section, a jack-basing cross-member not joined to but adapted to bear against and bridge the space between said uprights while resting removably atop said rails, a jack the base of which is adapted to rest against a predetermined surface portion of said cross-member, and vulcanizing means adapted to be interposed between an injured portion of the outer wall of a tire under repair and a head with which said jack is equipped.

4. The structure defined in claim 3, and wherein each rail comprises an open bottom and open-ended angle iron, and said cross-member comprising a channel iron.

References Cited in the file of this patent

UNITED STATES PATENTS

| | | |
|---|---|---|
| 2,479,229 | Goodman | Aug. 16, 1949 |
| 2,510,354 | Van Tassell | June 6, 1950 |
| 2,566,797 | Heintz | Sept. 4, 1951 |